Patented Nov. 14, 1950

2,530,358

UNITED STATES PATENT OFFICE 2,530,358

N,N-DIMETHYL-N'-(2-PYRIDYL)-N'-(2-BENZOTHENYL) ETHYLENE DIAMINE

Gustav J. Martin, Philadelphia, and Souren Avakian, Oreland, Pa., assignors to The National Drug Company, Philadelphia, Pa., a corporation of Pennsylvania No Drawing. Application August 28, 1948, Serial No. 46,727

1 Claim. (Cl. 260—296)

This invention relates to a new and unusually effective antihistamine which is relatively free from the disagreeable side reactions of the antihistamine products previously known. More particularly the invention is concerned with a specific benzothienyl derivative which has been found to possess particularly desirable properties as an antihistamine.

Various complex chemical compounds have been discovered which possess antihistamine properties and for this purpose have been of some help in relieving or eliminating allergic reactions to which large numbers of individuals are susceptible. These compounds, however, have side reactions which to many people are most annoying. For instance, they produce effects such as drowsiness, apprehension, and the like, which seriously curtail their general use.

It is an object of this invention to produce a new antihistamine which is particularly effective in the treatment of allergic reaction such as urticaria dermatoses, atopic dermatitis, penicillin and sulfonamide reactions, hay fever, vasomotor rhinitis and asthma, and which at the same time has to much less extent the undesirable side reactions of known antihistamines. Additional objects will become apparent from a consideration of the following description and claims.

These objects are obtained in accordance with our invention wherein we produce a new compound, N,N - dimethyl - N'(2 - pyridyl) - N' - (2-benzothenyl) ethylene diamine, which we have found to have the desirable antihistamine properties referred to previously, accompanied by little or no undesirable side reactions.

The antihistamine compound of our invention may be used either alone or in admixture with other antihistamine and therapeutic agents generally for the treatment of disorders attributable directly or indirectly to allergies.

We produce our antihistamine compound by reacting N,N - dimethyl - N'(2 - pyridyl) ethylene diamine with 2 - chloromethyl - benzothiophene, in accordance with the method described in the following example:

Example

1. N,N - dimethyl - N'(2 - pyridyl) ethylene diamine was prepared according to the procedure of Whitmore, Mosher, Goldsmith and Rytina, J. Am. Chem. Soc., volume 67, page 393 (1945).

2. N,N - dimethyl - N'(2 - pyridyl) - N' - (2-benzothenyl) - ethylene diamine.

A stirred suspension of 16.7 g. of N,N-dimethyl-N'(2 - pyridyl) ethylene diamine and 2.3 g. of lithiumamide in 300 cc. of toluene was heated on a steam bath for two hours, cooled, and a solution of 18.4 g. of 2 - chloromethylbenzothiophene (prepared in accordance with known procedures as disclosed by Avakain et al., J. Am. Chem. Soc., 70, 3075–3076 (1948)) in 100 cc. of toluene added slowly. After one hour the mixture was added to 300 cc. of water, the toluene layer separated, and water layer extracted with ether. The solvents were mixed and dried over sodium sulfate. Distillation gave 15 g. of product boiling at 210–212/0.2 mm. On crystallization from petroleum ether gave the pure compound melting at 80–81° C.

The antihistamine compound described above is advisably administered orally. It may be prescribed in solution or in capsule or tablet form. While the dosage will be dependent to a certain extent upon the condition of the patient and the desires of the physician, a general average would be in the range of 50 to 100 milligrams administered from one to three times daily. Topical application of this compound is also possible for instance in the form of solutions of approximately 0.1 to approximately 1.0% concentration.

We claim:

N,N - dimethyl - N' - (2 - pyridyl) - N' - (2-benzothenyl) - ethylene diamine.

GUSTAV J. MARTIN.
SOUREN AVAKIAN.

REFERENCES CITED

The following references are of record in the file of this patent:

Clapp et al., J. Am. Chem. Soc., 69, 1549 (1947).